United States Patent
Lamontagne (10) Patent No.: US 9,470,870 B2
(45) Date of Patent: Oct. 18, 2016

(54) OPTICAL ASSEMBLIES WITH TILT-CONTROLLED MOUNTING OF AN OPTICAL ELEMENT IN A BARREL

(71) Applicant: Institut National D'Optique, Québec (CA)

(72) Inventor: Frédéric Lamontagne, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 0 days.

(21) Appl. No.: 14/803,865

(22) Filed: Jul. 20, 2015

(65) Prior Publication Data
US 2016/0025950 A1    Jan. 28, 2016

Related U.S. Application Data

(60) Provisional application No. 62/029,125, filed on Jul. 25, 2014.

(51) Int. Cl.
*G02B 7/02*    (2006.01)

(52) U.S. Cl.
CPC ............ *G02B 7/022* (2013.01); *G02B 7/026* (2013.01)

(58) Field of Classification Search
CPC ........ G02B 7/003; G02B 7/02; G02B 7/021; G02B 7/022; G02B 7/026; G02B 7/18
USPC ................................. 359/829, 830
See application file for complete search history.

(56) References Cited

U.S. PATENT DOCUMENTS

| | | | | |
|---|---|---|---|---|
| 2,526,433 A | * | 10/1950 | Svensson | G02B 7/02 359/825 |
| 3,142,239 A | * | 7/1964 | Meixner | G02B 7/04 359/825 |
| 3,269,264 A | * | 8/1966 | Cocks | G02B 21/0016 356/391 |
| 3,378,020 A | * | 4/1968 | Grabiel | A45C 11/005 134/156 |
| 3,685,392 A | * | 8/1972 | Platt | F42B 3/113 102/201 |
| 3,888,568 A | | 6/1975 | Norris et al. | |

(Continued)

FOREIGN PATENT DOCUMENTS

| | | |
|---|---|---|
| CN | 203164577 U | 8/2013 |
| DE | 19943452 A1 | 3/2000 |

(Continued)

OTHER PUBLICATIONS

Lee et al., "Creative Optomechanical Tolerancing in Lens Systems", Proc. of the SPIE, vol. 3482, pp. 187-200, (1998).

(Continued)

*Primary Examiner* — Frank Font
(74) *Attorney, Agent, or Firm* — Merchant & Gould P.C.

(57) ABSTRACT

Optical assemblies have one or more optical elements mounted in the cavity of a barrel. The optical element has a curved abutment surface engaging a seat provided in the cavity. The barrel has an inner wall provided with a set of internal threads. External threads are provided on a peripheral wall of the optical element or on a perimeter wall of a retaining ring securing the optical element within the cavity. The internal and external threads have a thread profile including a load-bearing thread face perpendicular to the center axis of the cavity. The thread profile may define a Buttress thread profile or a square thread profile.

23 Claims, 9 Drawing Sheets

(56) References Cited

U.S. PATENT DOCUMENTS

| | | | |
|---|---|---|---|
| 4,390,260 A | 6/1983 | Prinz | |
| 4,733,945 A | 3/1988 | Bacich | |
| 4,778,252 A | 10/1988 | Filho | |
| 4,854,671 A | 8/1989 | Hanke et al. | |
| 4,883,968 A * | 11/1989 | Hipple | H01J 27/18 |
| | | | 250/423 R |
| 5,076,682 A * | 12/1991 | Pasfield | G02B 7/002 |
| | | | 351/158 |
| 5,121,251 A * | 6/1992 | Edwards | G02B 21/00 |
| | | | 359/368 |
| 5,177,641 A | 1/1993 | Kobayashi et al. | |
| 5,245,478 A * | 9/1993 | Luecke | G02B 7/003 |
| | | | 359/384 |
| 5,510,935 A | 4/1996 | Whitty et al. | |
| 6,292,311 B1 | 9/2001 | Bohn et al. | |
| 6,381,081 B1 | 4/2002 | Ford | |
| 7,990,632 B2 | 8/2011 | Monti | |
| 9,244,245 B2 * | 1/2016 | Lamontagne | G02B 7/003 |
| 2002/0021504 A1 | 2/2002 | Bayer et al. | |
| 2002/0176180 A1 * | 11/2002 | Ue | G02B 7/04 |
| | | | 359/819 |
| 2003/0076504 A1 * | 4/2003 | Marcus | G01B 9/02019 |
| | | | 356/479 |
| 2013/0182342 A1 * | 7/2013 | Chang | G02B 7/021 |
| | | | 359/829 |
| 2015/0131175 A1 | 5/2015 | LaMontagne et al. | |

FOREIGN PATENT DOCUMENTS

| | | | |
|---|---|---|---|
| JP | 2012173366 A | | 9/2012 |
| TW | 200829951 A * | 7/2008 | G02B 21/26 |

OTHER PUBLICATIONS

Dewitt et al., "Rigid Body Movements of Optical Elements due to Opto-Mechanical Factors", Proc. of the SPIE, vol. 5867, (2005).

Cheng et al., "A Study on the Optomechanical Tolerance Model for Lens Assembly", Proc. of the SPIE, vol. 6665, pp. 1-8 (2007).

Burge, "Mounting of Optical Components—Mounting of Lenses", The University of Arizona, pp. 1-46 (2011).

Yoder, "Mounting Optical Components in Optical Instruments", SPIE Press Book, p. 49 (2008).

* cited by examiner

OPTICAL ASSEMBLIES WITH TILT-CONTROLLED MOUNTING OF AN OPTICAL ELEMENT IN A BARREL

This application claims benefit of U.S. Ser. No. 62/029,125, filed 25 Jul. 2014 and which application is incorporated herein by reference. To the extent appropriate, a claim of priority is made to the above disclosed application.

FIELD OF THE INVENTION

The present invention relates to opto-mechanical systems and more particularly concerns an optical assembly having one or more optical elements mounted in the cavity of a barrel using threads designed to avoid a tilting of the optical element within the cavity.

BACKGROUND

Optical elements or components are omnipresent in devices, systems or arrangements where light needs to be directed, expanded, focussed, collimated or otherwise transformed or affected. Optical elements can for example be embodied by lenses, mirrors, Diffractive Optical Elements (DOE), assemblies of such elements, or the like.

In a typical optical system, most or all optical elements usually need to be precisely positioned and aligned in order to properly perform their intended optical function. This positioning and alignment typically involve securing the optical element in a holder or mount of some sort. Proper alignment of an optical element with respect to the holder is a delicate operation that generally requires tight manufacturing tolerances and careful handling.

Figure 1:
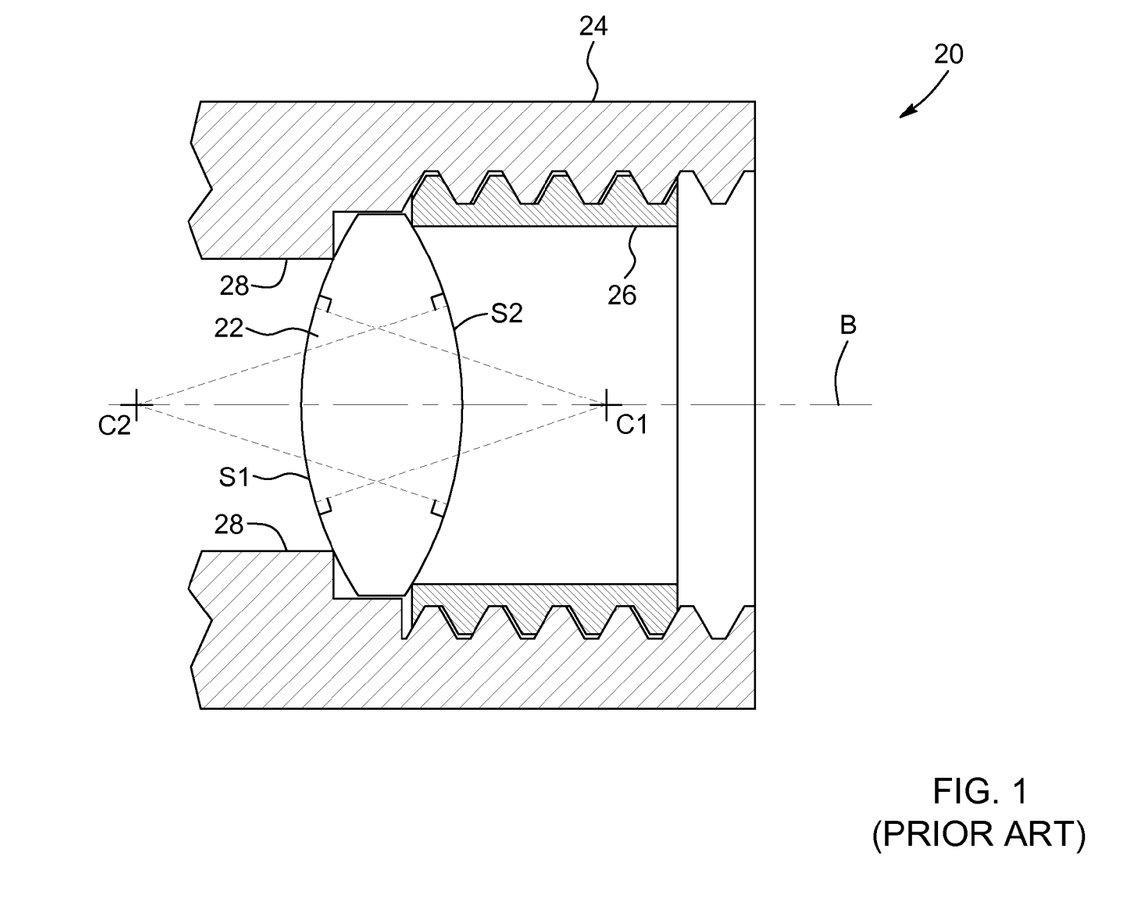
FIG. 1 (PRIOR ART) is a lens assembly showing a biconvex lens mounted in a lens barrel according to prior art.

Barrels are well known types of mechanical holders for optical elements. Barrels typically define a cylindrical cavity in which one or more optical elements are mounted. By way of example, a lens is a type of optical element that is often mounted in barrels. A lens generally needs to be centered with a precision that can be of the order of a few micrometers. Opto-mechanical assemblies in which lenses are mounted and precisely centered are known in the art. Referring to FIG. 1 (PRIOR ART), there is shown a typical assembly 20 including a lens 22, a barrel 24 and a retaining ring 26. The lens 22 is mounted in the barrel 24 with the periphery of one of its surfaces S1 in contact with a lens seat 28. The retaining ring 26 is typically screwed within the barrel 24 and abuts on the surface S2 of the lens 22 opposite to the lens seat 28, thus securing the lens 22 in the assembly 20. It is well known in the art that the lens is centered when the centers of curvature C1 and C2 of both surfaces S1 and S2 lie on the center axis B of the lens barrel 24.

The technique consisting in inserting a lens in a lens barrel and then securing the lens with a threaded ring is generally referred to as the "drop-in" lens technique. The centering precision obtained from this technique first depends on the minimum allowable radial gap between the lens and the barrel. Thermal effects caused by the mismatch of the respective coefficients of thermal expansion of the lens and barrel materials also have an impact on the centering of the lens. Manufacturing tolerances on dimensions of the components of the assembly such as the diameter of the lens, the diameter of the barrel cavity and the difference in thickness along the edge of the lens also affect the quality of the centering. The greater the precision required on the centering of the lens, the greater the manufacturing costs of both lens and barrel.

The main advantages of the drop-in technique are that the assembly time can be very short and that the lenses are removable. Low cost drop-in has, however, the drawback of a lower centering precision. The drop-in method may not be suitable when higher precision is required, and then an active alignment is typically chosen. In this centering method, the lens is first positioned inside the cavity and its decentering relative to the center axis of the barrel is measured. The lens is then moved to reduce the centering error. These steps can be repeated several times until the alignment of the lens complies with the centering requirements. Once centered, the lens is fixed in place with adhesive or other means. This method provides a very high level of centering accuracy, but requires expensive equipment while being time-consuming.

While the discussion above concerns mainly lenses, other types of optical elements can be mounted in a barrel, and such elements are confronted with the same issues as discussed above.

There therefore remains a need for an approach to mounting an optical element in a barrel which alleviates at least some of the drawbacks of known techniques.

SUMMARY

In accordance with one aspect, there is provided an optical assembly having a barrel defining a cavity having a center axis. The barrel has an inner wall provided with a set of internal threads. The optical assembly further includes at least one optical subassembly, the at least one optical subassembly including a seat provided in the cavity and an optical element mounted in the cavity. The optical element has a first surface defining a curved abutment surface engaging the seat, and a second surface opposite to the first surface and having a spatial profile which is planar along at least a peripheral region of the second surface. The at least one optical subassembly further includes a retaining ring inserted in the cavity and having a perimeter wall provided with a set of external threads engaging the internal threads of the inner wall of the barrel. The retaining ring also has an abutment engaging the peripheral region of the second surface of the optical element, thereby securing the optical element between the seat and the retaining ring. The internal and external threads have a thread profile including a load-bearing thread face perpendicular to the center axis of the cavity.

In some implementations, the internal and external threads have a "Buttress"-type thread profile. In other implementations, a square thread profile may be used.

The use of a thread profile including a load-bearing thread face perpendicular to the center axis of the cavity advantageously ensures a tilt-controlled mounting of the optical element within the barrel. More precisely, the provision of such a load-bearing thread face can ensure that any unavoidable decentering of a threaded retaining ring will not be accompanied by a subsequent tilt of the ring as it secures the optical element. As a result, the decentering of the retaining ring will not alter a previous alignment of the optical element, provided that the retaining ring engages a peripheral portion of the surface of the optical element that is deliberately made planar.

In accordance with another aspect, there is provided an optical assembly which includes a barrel defining a cavity having a center axis, the barrel having an inner wall provided with a set of internal threads. The optical assembly further includes at least one optical subassembly. The at least one optical subassembly has a seat provided in the cavity and an optical element mounted in the cavity. The optical element has a curved abutment surface engaging the seat and a perimeter wall provided with a set of external threads engaging the internal threads of the inner wall of the barrel. The internal and external threads have a thread profile including a load-bearing thread face perpendicular to the center axis of the cavity.

Further features and advantages of the present invention will be better understood upon reading of preferred embodiments thereof with reference to the appended drawings.

DETAILED DESCRIPTION OF EMBODIMENTS

The description below generally relates to optical assemblies where one or more optical elements are mounted in the cavity of a barrel.

Referring to FIGS. 2 and 2A to 2C, there is shown an optical assembly 20 according to a first embodiment. The optical assembly 20 includes a barrel 24 defining a cavity 32. The barrel 24 may be embodied by any housing structure in which an optical element 22 is to be mounted, aligned and secured in position. Typical barrels such as the one illustrated herein include a hollow cylindrical housing 30 having an inner wall 34 and an outer wall 36. At least a portion of the inner wall 34 of the barrel 24 is provided with a set of internal threads 42a, which will be described further below. The hollow portion of the cylindrical housing 30 forms the cavity 32, which may have any shape adapted to receive the optical element 22 therein. The cavity 32 has a center axis B, defined as its symmetry axis.

It will be readily understood that the barrel 24 may have any shape, mechanical features or additional components adapted to engage, connect to or otherwise interact with other structures as required by the context in which the optical element 22 is to be used. For example, the outer wall 36 of the barrel may be provided with threads, holes, pins, projections, flanges and the like without departing from the scope of the invention. Alternatively, the barrel 24 may be an integral part of a larger optical assembly, such as for example a camera objective or a microscope objective.

The optical assembly 20 includes one or more optical subassemblies 31. Although a single optical subassembly 31 is shown in the illustrated embodiment of FIGS. 2 and 2A to 2C, it will be readily understood that in other implementations more than one optical subassembly may be provided in a same barrel without departing from the scope of the invention. Each optical subassembly 31 includes a seat 28 provided in the cavity 32 and an optical element 22 mounted in the cavity as explained further below.

It will be readily understood that according to implementations of the optical subassembly described herein, the optical element 22 may act on light in some fashion, for example to direct or change the direction of a light beam, focus or expand, collimate, filter, or otherwise transform or affect light. Examples of optical elements include lenses of various types, such as for example plano-convex, biconvex, plano-concave, biconcave, positive or negative meniscus lenses, as well as cemented doublet or triplet lenses of the types listed above. Other typical optical elements include diffractive lenses, curved mirrors, diffractive optical elements (DOEs), pinholes, or the like. In other embodiments, the optical element 22 may be embodied by a more complex grouping of optical components such as for example one or more lenses mounted in a sleeve, a mirror or a lens mounted in a spider, a lens or a lens barrel mounted in an optical mount which is itself mounted on an optical bench, etc.

Generally speaking, each optical subassembly 31 includes two features which cooperate to provide a proper alignment of the corresponding optical element 22 within the cavity 32: a curved abutment surface engaging the seat 28, and a set of external threads 42b engaging the internal threads 42a of the cavity 32. These features may be provided on a same or on different components of the optical subassembly 31, as will become apparent from the examples described below.

Referring still to FIGS. 2 and 2A to 2C, in some implementations the optical element 22 has a first surface S1 defining the curved abutment surface, and a second surface S2 opposite to the first surface S1 and having a spatial profile that is planar over at least a peripheral region 27 of the second surface S2. In the illustrated example of FIGS. 2 and 2A to 2C, the optical element 22 is embodied by a plano-convex lens, where the first surface S1 is spherical and the spatial profile of the second surface S2 is planar over its full extent. With additional reference to FIG. 3A, there is shown a variant of the optical assembly 20 where the optical element 22 is embodied by a meniscus lens. In this latter embodiment the first surface S1 of the optical element 22 is spherical or cylindrical with a convex curvature, whereas the second surface S2 has a spatial profile that is planar over the peripheral region 27 and curved within a central region 46, defining a concave spherical or cylindrical shape. It will be readily understood that the curved abutment surface may also have an aspherical spatial profile. In other variants, the optical element 22 may be embodied by a plano-concave lens, a biconvex or biconcave lens having a planarized peripheral region 27 over the second surface S2, or the like. Alternative embodiments of the optical element 22 are presented on other figures and will be described further below.

Referring back to FIGS. 2 and 2A to 2C, in the illustrated embodiment the optical subassembly 31 also includes a retaining ring 26 inserted in the cavity 32. The retaining ring 26 has a perimeter wall 29 provided with the external threads 42b of the optical subassembly 31. The retaining ring 26 also has an abutment 44 engaging the peripheral region 27 of the second surface S2 of the optical element 22. In this manner, the optical element 22 can be secured between the seat 28 and the retaining ring 26.

Figures 2, 2B, 2C:
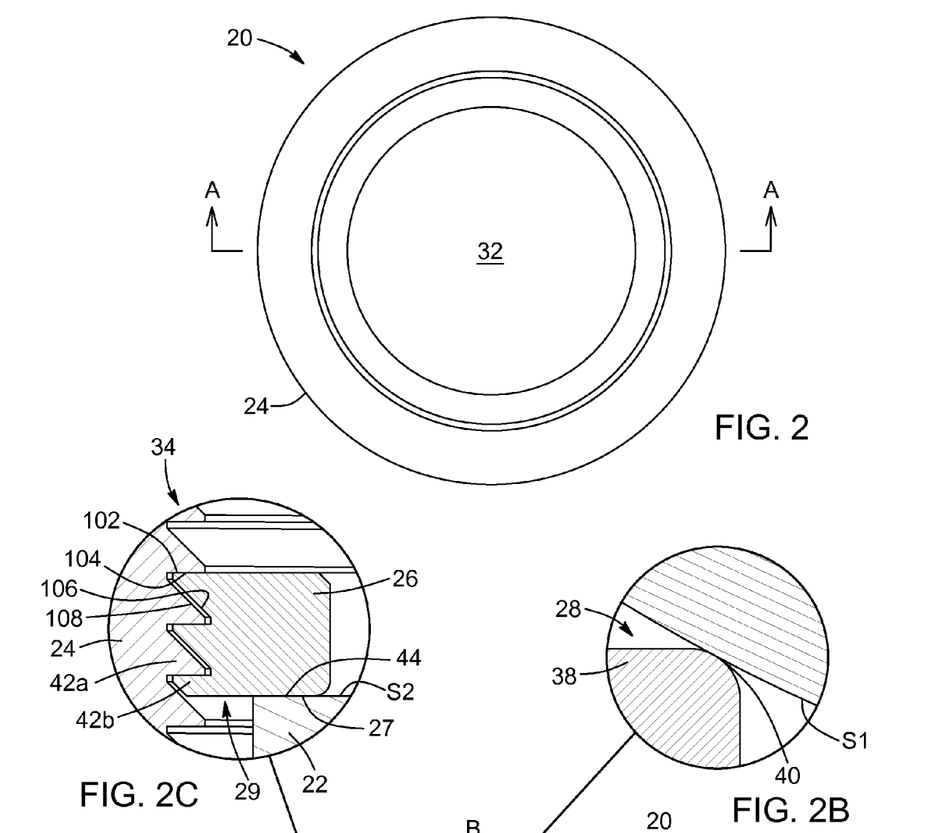
FIG. 2 is a schematic top view of an optical assembly according to one embodiment.
FIG. 2B is an enlarged view of a portion of FIG. 2A showing the engagement of the first surface of an optical element with the seat of a barrel.
FIG. 2C is an enlarged view of a portion of FIG. 2A showing the engagement of the peripheral region of the second surface of the optical element with a retaining ring.
Figure 2A:
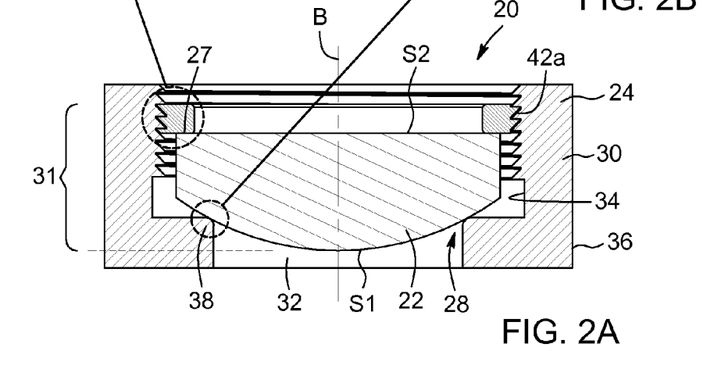
FIG. 2A is a cross-sectional view taken along line AA of FIG. 2.
Figure 4A:
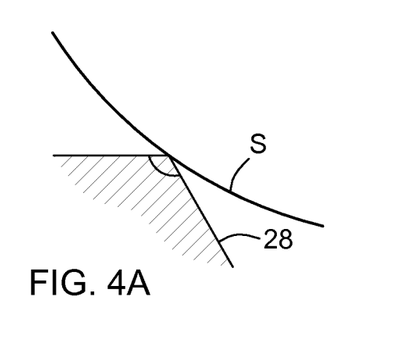
FIGS. 4A to 4D are schematic illustrations of different types of contacts between a seat and a surface of an optical element.
Figure 4B:
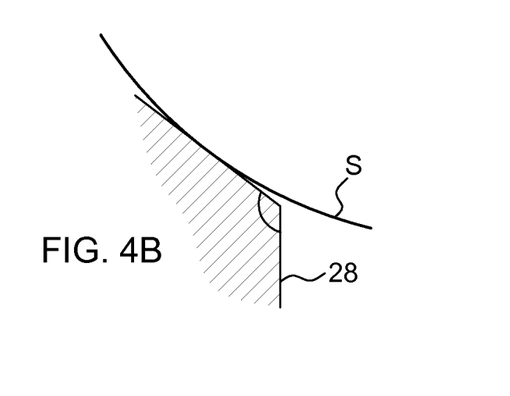
Figure 4C:
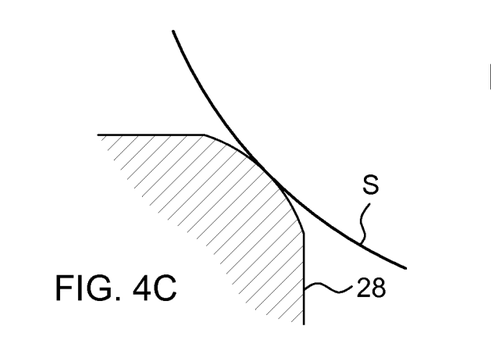
Figure 4D:
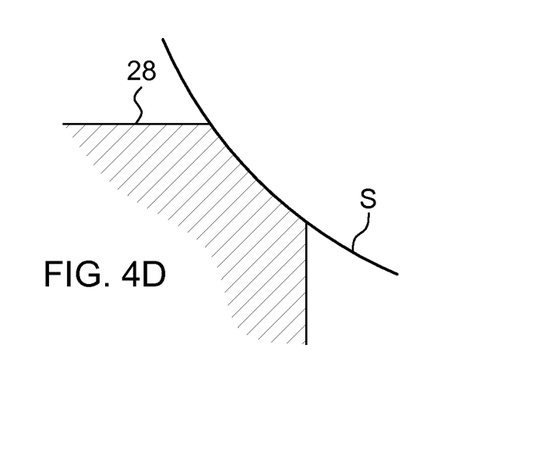

On one side of the optical subassembly 31, the alignment of the optical element 22 within the cavity is determined by the engagement of the seat 28 with the first surface S1 of the optical element 22, as best seen in FIG. 2B. In some embodiments, the seat 28 may be defined by an annular shoulder 38 formed in the inner wall 34 and projecting inwardly within the cavity 32. In the illustrated embodiment, the shoulder 38 is shown as forming a right angle with respect to the inner wall 34 of the barrel 24, such that the first surface S1 rests on a corner edge 40 of the shoulder 38. Optionally, as illustrated, the corner edge 40 can be rounded or bevelled by polishing or machining to avoid damaging the first surface S1 of the optical element 22. It will be readily understood that in other embodiments the contact between the first surface S1 and the seat 28 may be different. For example, referring to FIGS. 4A to 4D, different types of possible engagement schemes between a surface S and a seat 28 may include:
- an edge contact (FIG. 4A), where the curved surface S rests on an edge of the seat 28. The edge need not define a right angle.
- a tangential contact (FIG. 4B), where the curved surface S rests on a wall of the seat 28 that is oriented along a tangent of the surface at the contact point;
- a toroidal contact (FIG. 4C), where the seat 28 itself is curved along the contact point and has a curvature opposite to that of the surface S;
- a spherical contact (FIG. 4D), where the seat 28 is curved along the contact point with a curvature matching that of the surface S.

It is to be noted that embodiments of the optical subassembly 31 are not limited to cases where the abutment surface is curved along its entire extent. In alternative embodiments, only a peripheral portion of the first surface of the optical element engaging the seat may be machined or otherwise shaped to define the curved abutment surface, whereas the remainder of the first surface may have a different shape without departing from the scope of the invention.

From a reading of the present specification as a whole, one versed in the art will readily understand that the optical subassembly 31 should allow for some movement between the first surface S1 of the optical element 22 and the seat 28. In some embodiments, this implies that the optical element 22 meets the so-called "self-centering" criterion known in the art. Self-centering refers to the capacity of the optical element 22 to roll or slide on the seat 28. It is known to call "self-centered" an optical element 22 that has a friction coefficient with respect to the seat 28 and retaining ring 26 sufficiently small to allow a rolling or other movement of the optical element 22. As for example known from Paul Yoder Jr., "Mounting Optics in Optical Instruments", SPIE Press (2008), the threshold for the friction coefficient can be expressed as:

$$\mu \leq \left| \frac{Y_{c1}}{2R_1} + \frac{Y_{c2}}{2R_2} \right| \quad (1)$$

where:
- $\mu$ is the friction coefficient between the optical element and the seat or retaining ring;
- $Y_{c1}$ is the half-diameter of contact of the first surface S1 of the optical element with the seat;
- $Y_{c2}$ is the half-diameter of contact of the second surface S2 of the optical element with the retaining ring;
- $R_1$ is the radius of curvature of the first surface of the optical element; and
- $R_2$ is the radius of curvature of the second surface of the optical element.

In Equation (1), the radius of curvature of each surface has a positive value for convex surfaces and a negative value for concave surfaces. It will also be noted that in the case of a plano-concave optical element such as shown in FIGS. 2 and 2A to 2C, the radius of curvature $R_2$ of the second surface would be infinite or very large, such that the second term in the right-hand side of Equation (1) would vanish.

The seat 28 may take any other shape suitable for supporting the abutment surface of the optical element 22. By way of example, with reference to FIG. 3C there is shown an embodiment where the optical element 22 is a plano-concave lens, the first surface S1 therefore having a concave shape. In this example, the seat 28 is shaped as a lip on which the abutment surface may rest. In some embodiments the seat 28 need not extend along the entire circumference of the inner wall 34 of the barrel but may include missing portions or other discontinuities, or may be embodied by a plurality of radially aligned projections spaced apart along the inner wall. In other implementations, the seat 28 may be embodied by a separate structure affixed to the barrel 24, such as for example a ring-shaped component threaded to the barrel 24 or otherwise affixed to the barrel 24.

One skilled in the art will understand that the centering error of the surface S1 according to the center axis B of the barrel 24 depends on the concentricity of the seat 28 and on any manufacturing error in its perpendicularity relative to the center axis B. However, these manufacturing errors can be kept very low by using suitable manufacturing practices. For example, currently-available techniques can provide centering errors typically less than 5 µm.

On the side of its second surface S2, the alignment of the optical element 22 within the cavity is impacted by the engagement of this second surface S2 with the abutment 44 of the retaining ring 26, as well as by the engagement of the internal and external threads 42a and 42b. Indeed, any tilt of the retaining ring 26 with respect to the center axis of the cavity is directly imparted onto the optical element 22. With particular reference to FIG. 2C, the engagement of the internal and external threads 42a and 42b will now be described in more details.

The expression "threads" is meant to refer to engageable helicoidal projections machined on two components allowing one component to be screwed on or within the other. By convention, a single thread is generally considered to be the portion of a helicoidal projection corresponding to one screw turn, whereas the length of the projection defining the entire screw path is referred to as threading or a set of threads. Also, by convention, internal threads are provided in a bore or cavity intended to receive another component, whereas external threads are provided on the outside of the component being screwed into this bore or cavity. Therefore, in the illustrated embodiment of FIG. 2C, the internal threads 42a are machined on the inner wall 34 of the barrel 24 whereas the external threads 42b are machined on the perimeter wall 29 of the retaining ring 26, such that the retaining ring 26 can be screwed inside the cavity 32. It will be readily understood that either set of threads 42a, 42b need not be continuous along the entire screw path, but may include missing segments or other discontinuities as long as sufficient contact points are provided to allow smooth engagement of the threads. The internal and external threads 42a and 42b have thread profiles that are complementary, and both include a load-bearing thread face perpendicular to the center axis B of the cavity. The expression "thread profile" refers to the cross-sectional shape, angle and pitch formed by the threads of a given set. By "complementary", it is understood that the profiles of the internal threads 42a and external threads 42b are such that they can be screwed together, which usually involves a same pitch. Although the internal threads 42a and external threads 42b are shown as having a same overall profile in the illustrated embodiments, in other variants they may have different shapes as long as the complementary condition as explained above is met.

In optical assemblies such as described herein, when the retaining ring 26 is screwed within the barrel 24 and abuts on the optical element 22, the resulting mechanical forces in the system typically act to push the retaining ring 26 away from the optical element 22. In the illustrated reference frame of FIG. 2C, it can be seen that the barrel 24 and the retaining ring 26 are engaged in such a manner that the top surface 104 of each external thread 42b on the retaining ring 26 pushes against the bottom surface 102 of an internal thread 42a machined in the barrel 24. It will be understood that reference to "top" and "bottom" directions is used herein as shorthand for ease of reference to FIG. 2C, and is not meant to impart any preferential orientation to the optical assembly.

In practice, the impact of the bottom surface 106 of each external thread 42b and the top surface 108 of each internal thread 42a is null or negligible in the balance of forces within the assembly; these surfaces do not contact each other or any other surface. As the entire load of the engagement between the internal and external threads is borne by the top surface 104 of the external threads 42b and the bottom surface 102 of the internal threads 42b, these latter surfaces are deemed to be "load-bearing" faces of the threads.

In accordance with one aspect, the thread profiles of the internal and external threads 42a and 42b are such that their load-bearing faces are perpendicular to the center axis B of the cavity. In the reference frame of FIG. 2C, the load-bearing faces therefore extend horizontally. It can also be said that the load-bearing thread faces are perpendicular to the screw direction of the retaining ring 26 within the barrel 24, since this direction is parallel to the center axis B of the cavity.

Figure 3A:
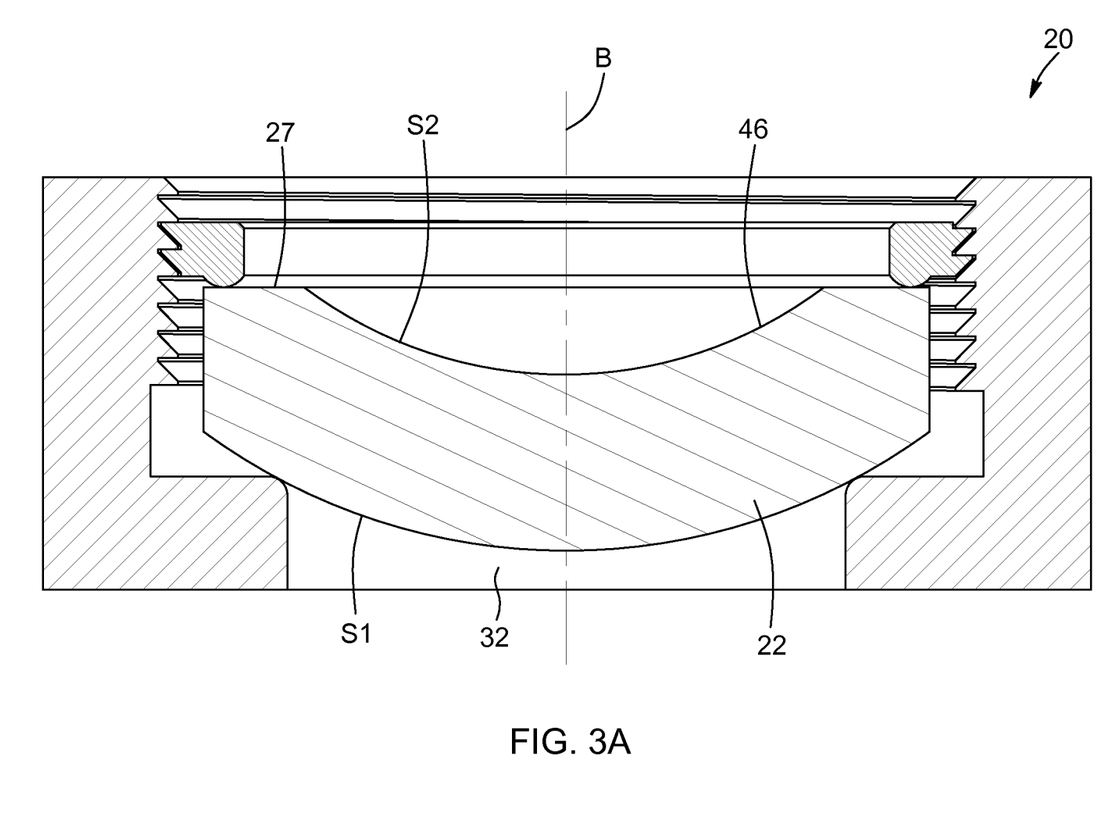
FIG. 3A is a schematic illustration of an optical assembly according to one embodiment, where a meniscus-type lens is mounted in a barrel using a retaining ring with Buttress threads.
Figure 3B:
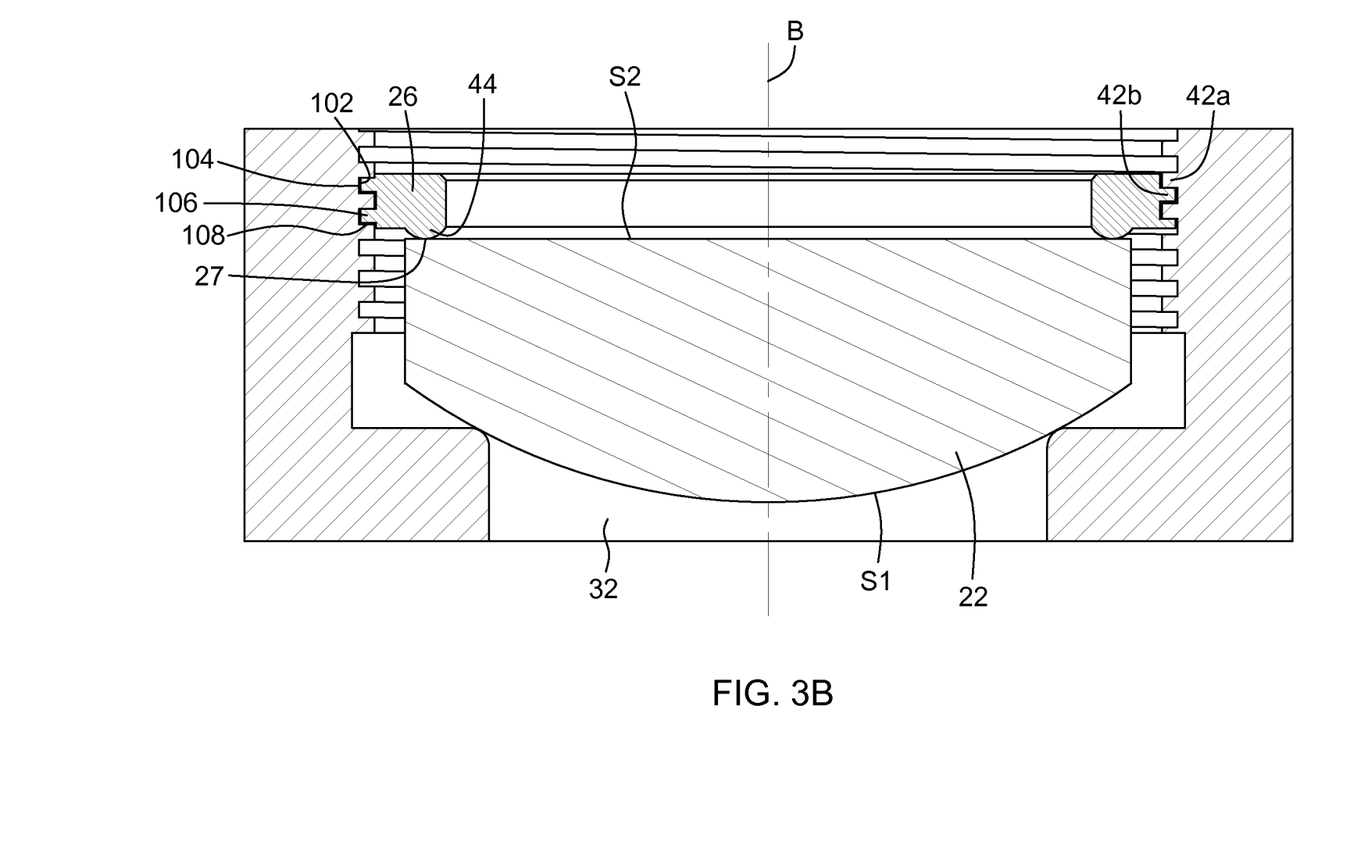
FIG. 3B is a schematic illustration of an optical assembly according to one embodiment, where a plano-convex lens is mounted in a barrel using a retaining ring with square threads.
Figure 3C:
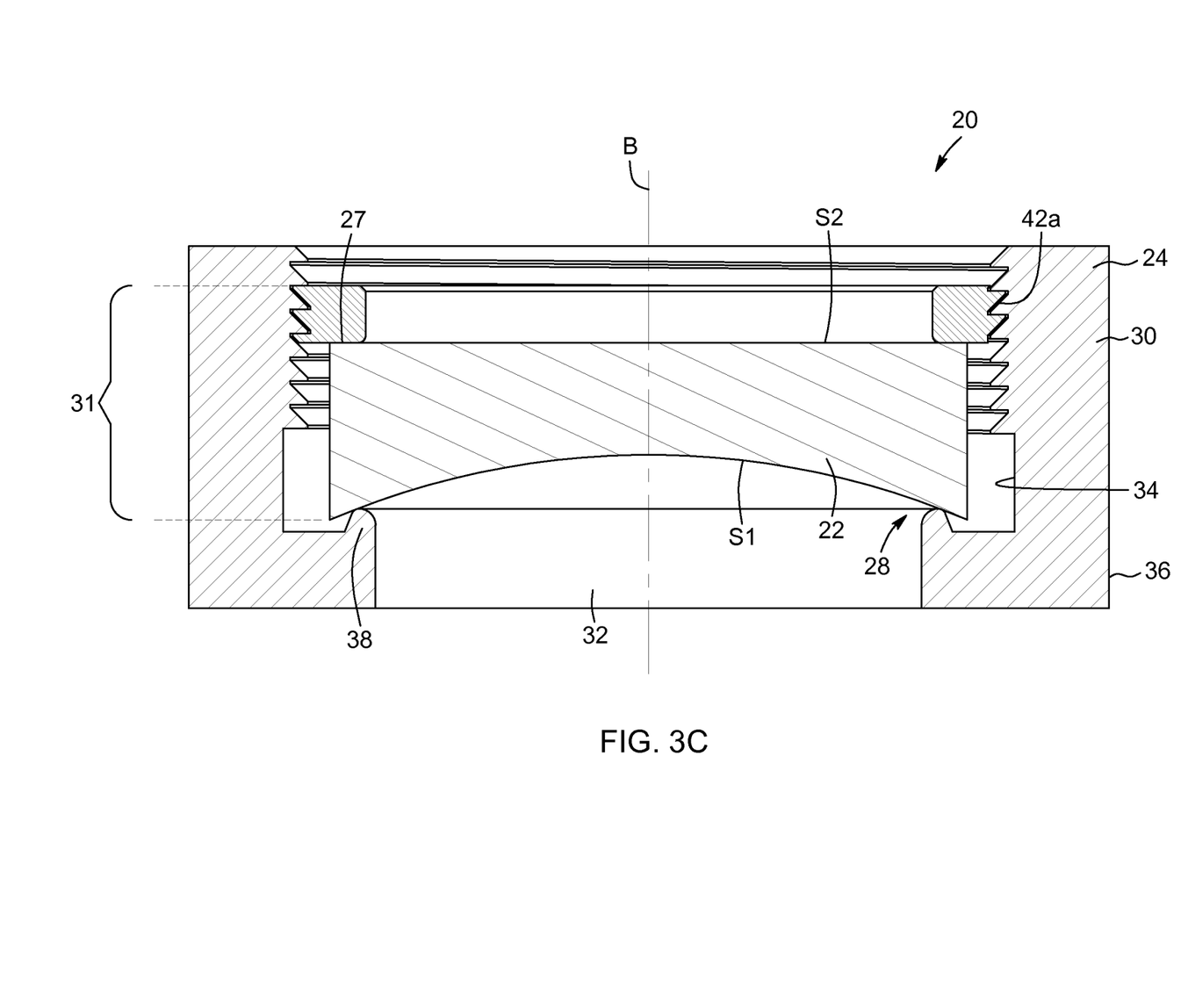
FIG. 3C is a schematic illustration of an optical assembly according to one embodiment, where a plano-concave lens is mounted in a barrel using a retaining ring with Buttress threads.

Still referring to FIGS. 2, 2A to 2C, at least the peripheral region 27 of the second surface S2 of the optical element 22 is planar, and therefore extends parallel to the plane defined by the load-bearing faces of the threads when engaged by the retaining ring 26. The abutment 44 of the retaining ring 26 is also planar, leading to a planar contact between the retaining ring 26 and the second surface S2 of the optical element 22. Referring to FIGS. 3A and 3B, in another variant, the abutment 44 of the retaining ring 26 may have a curved surface engaging the planar peripheral portion 27 of the second surface S2 of the optical element 22.

It will be readily understood by one skilled in the art that the meaning of "planar" in the context of the peripheral region 27 of the second surface S2 need not be limited to strict mathematical planarity with an infinite radius of curvature. In some variants, the peripheral region 27 of the second surface may be curved with a radius of curvature sufficiently large so that the impact of a decentering of the retaining ring 26 on the alignment of the optical element 22 is negligible or within the tolerances prescribed for a given assembly.

In the illustrated embodiment of FIGS. 2 and 2A to 2C the use of load-bearing thread faces perpendicular to the center axis B of the cavity 32, in combination with a planar peripheral region of the second surface, nullifies the impact of the decentering of the retaining ring 26 on the alignment of the optical element 22 in the cavity. The threads used in typical optical assemblies of the prior art have a triangular shape with a thread angle of 60°, which means that the load-bearing faces are tilted by 30° with respect to the plane perpendicular to the screwing direction. As a consequence, any decentering of the retaining ring within the cavity leads to a proportional tilt of the retaining ring, the tilt being transferred, in turn, to the optical element. In accordance with the embodiments described herein, through the provision of load-bearing thread faces perpendicular to the center axis B of the cavity, the retaining ring 26 will not be tilted by the orientation of the threads no matter the amount of horizontal play of the retaining ring 26 within the cavity 32. Also, advantageously, the force applied on the optical element 22 by the retaining ring 26 is parallel to the center axis B, that is, vertical in the reference frame of the drawings. No tilt is therefore imparted on the optical element 22 itself, therefore avoiding the detrimental impact such a tilt would have on its optical alignment. It will be noted that in such a configuration, the centering of the optical element 22 within the cavity 32 is mainly determined by the engagement of the first surface S1 with the seat 28.

Referring back to FIGS. 2, 2A to 2C, as mentioned above, the orientation of the top surface 108 of the internal thread 42a and of the bottom surface 106 of the external thread 42b does not significantly impact on the alignment of the optical element 22 within the cavity. In one embodiment, each of these surfaces defines a slanted thread face making an acute angle of about 45° with the load-bearing thread faces. The resulting thread profile is otherwise known in the art as a "Buttress" threads. Of course, the slanted thread faces could have a different angle without departing from the scope of the invention, and thread profiles generally defined by a load-bearing thread face perpendicular to the axis of the cavity and the other thread face slanted at any angle will be referred to herein as "Buttress-type" threads. Buttress-type threads are best known for machinery applications, where they can be used to handle a very high axial thrust in one direction.

It will be understood that embodiments of the invention may make use of other thread profiles that include a load-bearing thread face perpendicular to the center axis of the cavity but that would not be thought of as being of the Buttress type. In one example, referring to FIG. 3B, a square thread profile, also referred to in the art as a rectangular thread profile, may be used. As their name entails, square threads 42a, 42b have a square-shaped cross section and both the load-bearing (102, 104) and load-free (106, 108) thread faces are perpendicular to the center axis B of the cavity 32.

Figure 5:
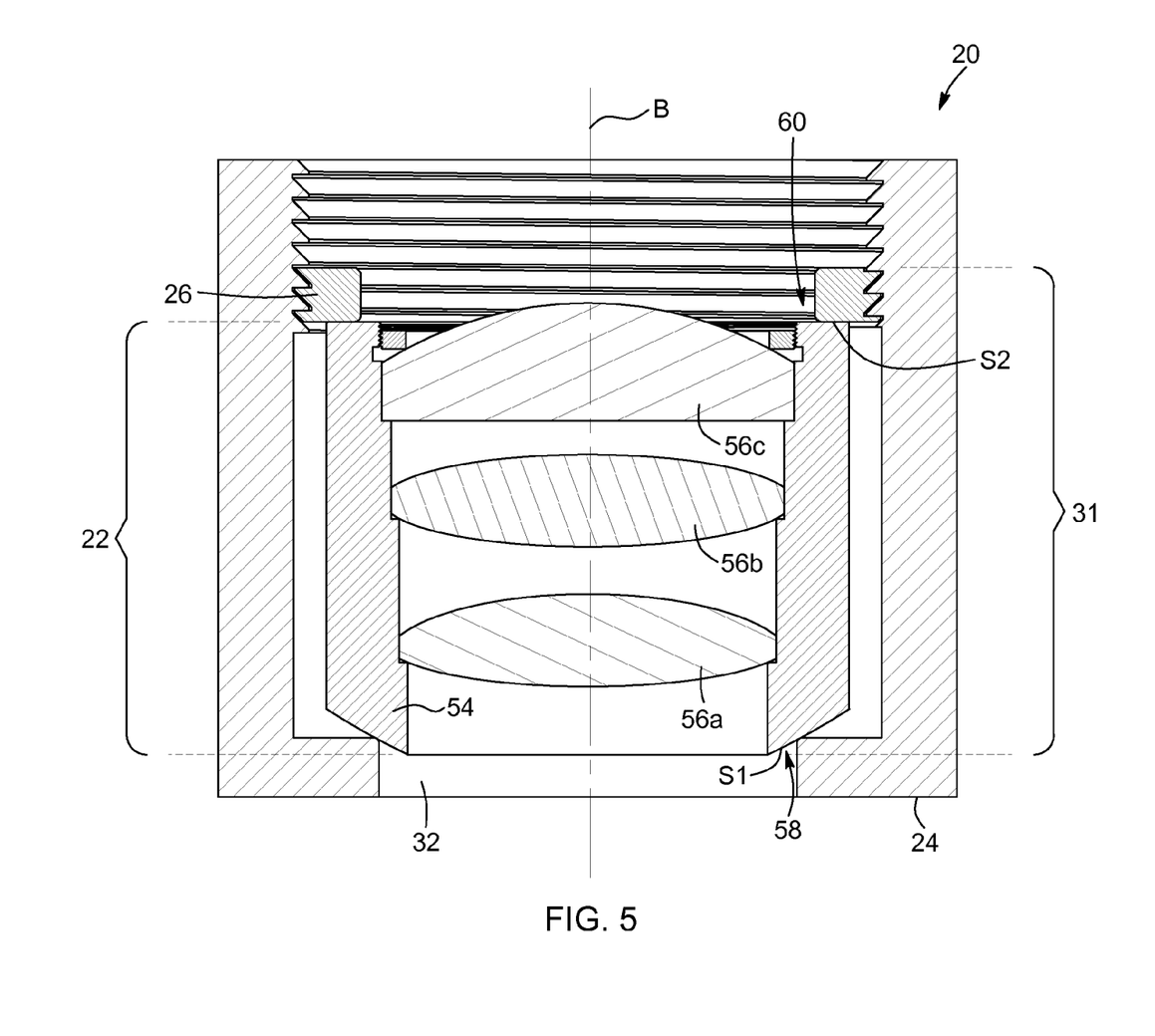
FIG. 5 is a schematic illustration of an optical assembly according to one embodiment, where the optical element is a sleeve mounted in the cavity of a barrel using a retaining ring with Buttress threads.

Referring to FIG. 5, there is shown another embodiment of an optical assembly 20 with an optical subassembly 31 including an optical element 22 and a retaining ring 26. In this implementation, the optical element 22 is embodied by a sleeve 54 inserted inside the cavity 32 of the barrel 24 and held therein by the retaining ring 26. The sleeve has opposite lower and upper ends 58 and 60 respectively defining the first and second surfaces S1 and S2.

One or more optical components can be mounted in the sleeve 54. Although three such optical components 56a, 56b, 56c are shown in FIG. 5, it will be readily understood that in different variants the number of optical components may vary. Each optical component 56a, 56b, 56c may for example be embodied by a lens, a curved mirror, a diffractive optical element, a pinhole or the like. Preferably, each optical component 56a, 56b, 56c is centered with respect to the sleeve 54, such that proper centering of the sleeve 54 in the cavity 32 will automatically center the optical components 56a, 56b, 56c with respect to the center axis B of the cavity 32. In various implementations, the optical components 56 may be mounted in the sleeve 54 using the common "drop-in" approach, and may be held in place using a threaded ring, a snap ring, a flexure, an elastomeric retainer, a burnished edge or any other suitable means. In some embodiments, one or more of the optical components may be auto-centered within the sleeve 54 using a threaded retaining ring 26, in accordance with the principle explained in U.S. Pat. Appl. Pub. No. 2015/0131175 (LAMONTAGNE et al.), filed on Jul. 11, 2014 and entitled "Auto-centering of an optical element within a barrel", the entire contents of which being incorporated herein by reference. The optical components 56 may also be centered according to a different technique, for example with an active alignment followed by bonding.

Figure 6:
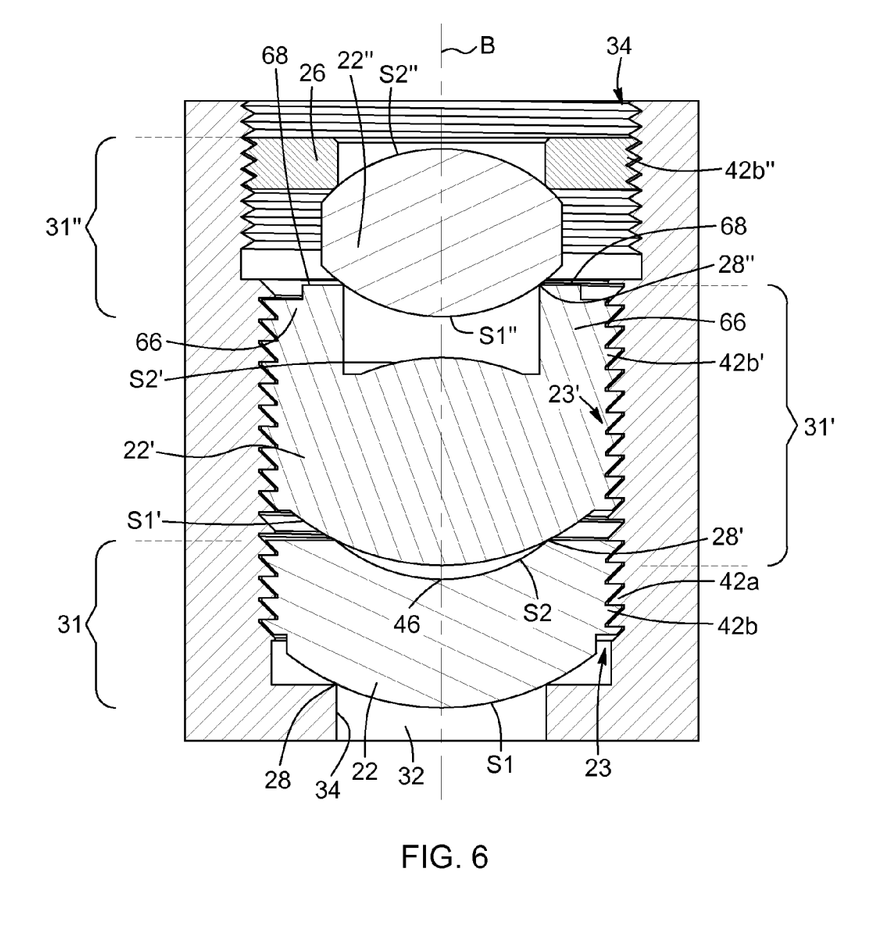
FIG. 6 is a schematic illustration of an optical assembly according to one embodiment, where two optical elements provided with Buttress threads are mounted in the cavity of a barrel.

Referring now to FIG. 6, there is illustrated another embodiment of the optical assembly 20 which includes several optical subassemblies 31, 31', 31". While at least one of these optical subassemblies preferably includes threads with a thread profile including a load-bearing thread face perpendicular to the center axis of the cavity, it will be readily understood that other subassemblies of the same optical assembly may be centered according to a different principle without departing from the scope of the invention.

In the illustrated variant, from bottom to top, a first optical subassembly 31 includes the corresponding optical element 22, here embodied by a meniscus lens having a convex first surface S1 and a second surface S2 that is concave at least around its central region 46. As with previous embodiments, the first surface S1 of the optical element defines the curved abutment surface, which is supported by a seat 28 formed integrally within the inner wall 34 of the cavity 32. However, in this case the optical element 22 has a perimeter wall 23 directly provided with the external threads 42b, the latter engaging the internal threads 42a machined in the inner wall 34 of the cavity 32. The internal and external threads 42a and 42b have a thread profile including a load-bearing thread face perpendicular to the center axis B of the cavity, for example a Buttress-type thread profile in the illustrated embodiment. The second illustrated optical subassembly 31' also includes the corresponding optical element 22', with first and second surfaces S1' and S2', and also having a perimeter wall 23' directly provided with the external threads 42b'. The internal and external threads 42a and 42b' also have a Buttress-type thread profile. Finally, the third optical subassembly 31" includes an optical element 22" embodied by a biconvex lens having a first surface S1" defining the curved abutment surface and an opposite second surface S2". The third optical subassembly 31" also includes a retaining ring 26 provided with the external threads 42b". It will be noted that the load-bearing thread face of the thread profile is not perpendicular to the center axis of the cavity in this particular subassembly. As a consequence, the internal threads on the inner wall of the cavity are machined with two different thread profiles in this exemplary embodiment, which is also characterized by a cavity having two sections of differing diameters.

One can see in the particular implementation of FIG. 6 that the second surface S2 of the optical element 22 of the first subassembly 31 acts as the seat 28' that engages the first surface S1' of the optical element 22' of the second subassembly 31'. Furthermore, the optical element 22' of the second subassembly 31' is shaped so as to define an upwardly projecting annular structure 66. The upper extremity 68 of this upward projecting annular structure 66 acts as the seat 28" engaging the first surface S1" of the optical element 22" of the third subassembly 31". The upwardly projecting annular structure 66 therefore also serves as a spacer between the second and third subassemblies 31' and 31".

Embodiments where external threads are provided on the perimeter wall of the optical element may be particularly advantageous for plastic and/or molded elements, in circumstances where a stack of several optical elements is required, or simply if it is found desirable to avoid the use of retaining rings or spacers. The optical element of such embodiments may be a lens, a curved mirror, a diffractive optical element, a pinhole or the like. Preferably, in such embodiments the optical element or at least its perimeter wall is made of a material suitable for machining the external threads therein, such as for example plastics.

Of course, the number and configuration of optical elements mounted in the cavity can vary from one embodiment to the next and the example shown in FIG. 6 is provided only for illustrative purposes.

Figure 7:
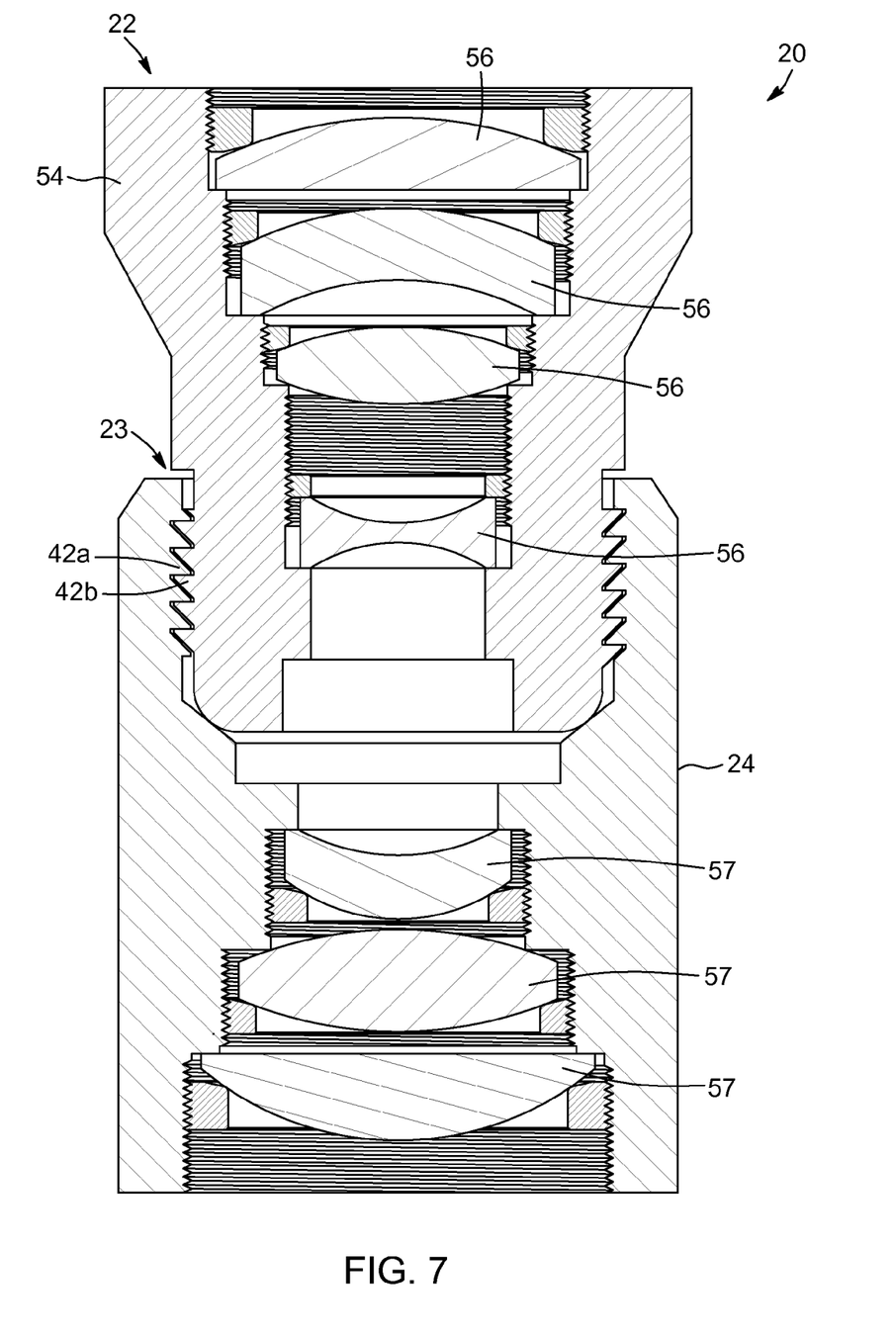
FIG. 7 is a schematic illustration of an optical assembly according to one embodiment, where a sleeve provided with Buttress threads is mounted in a cavity at an extremity of a barrel.

Referring to FIG. 7, there is shown another implementation of an optical assembly 20 where the external threads 42b are provided on a perimeter wall 23 of the optical element 22. In this case, the optical element 22 is embodied by a sleeve 54 having one or more optical components 56 mounted therein. As with the embodiment described with reference to FIG. 5, the optical components 56 may be mounted in the sleeve 54 using any appropriate technique known in the art. Of course, the number, nature and configuration of the optical components shown in FIG. 7 are provided by way of example only and should not be considered limitative to the scope of the invention.

In the embodiment of FIG. 7, the sleeve 54 may be viewed as a second barrel mounted concentrically in an extremity of a first barrel 24, in which additional optical elements 57 such as lenses, mirrors, diffractive optical elements, pinholes or the like are mounted and preferably centered using an appropriate technique. It is known in the art that such a head-to-head barrel configuration requires precise machining features, such as precisely fitted inner and outer diameters, to reduce the centering error to an acceptable level. Prior art configurations of this type have a radial centering error of one barrel with respect to the other typically from 0.1 mm down to 0.010 mm. The embodiment shown in FIG. 7 can limit the centering error to 6 µm or less, depending on the geometrical tolerances of the seat on which the sleeve 54 abuts.

Of course, numerous modifications could be made to the embodiments described above without departing from the scope of the present invention as defined in the appended claims.

The invention claimed is:

1. An optical assembly, comprising:
a barrel defining a cavity having a center axis, the barrel having an inner wall provided with a set of internal threads; and
at least one optical subassembly, the at least one optical subassembly comprising a seat provided in the cavity and an optical element mounted in the cavity, the optical element having a first surface defining a curved abutment surface engaging the seat, and a second surface opposite to the first surface and having a spatial profile which is planar along at least a peripheral region of said second surface, the at least one optical subassembly further comprising a retaining ring inserted in the cavity and having a perimeter wall provided with a set of external threads engaging the internal threads of the inner wall of the barrel, the retaining ring having an abutment engaging the peripheral region of the second surface of the optical element, thereby securing the optical element between the seat and the retaining ring;
wherein the internal threads and the external threads have a thread profile including a load-bearing thread face perpendicular to the center axis of the cavity.

2. The optical assembly according to claim 1, wherein the curved abutment surface has a convex or a concave spatial profile.

3. The optical assembly according to claim 1, wherein the curved abutment surface has a spatial profile that is spherical, aspherical or cylindrical.

4. The optical assembly according to claim 1, wherein the thread profile of the internal threads and the external threads is a Buttress thread profile.

5. The optical assembly according to claim 1, wherein the thread profile of the internal threads and the external threads further includes a slanted thread face making an acute angle with the load-bearing thread face.

6. The optical assembly according to claim 1, wherein the thread profile of the internal threads and the external threads is a square thread profile.

7. The optical assembly according to claim 1, wherein the optical element is a lens, a mirror, a diffractive optical element or a pinhole.

8. The optical assembly according to claim 1, wherein the spatial profile of the second surface of the optical element is planar over a full extent of said second surface.

9. The optical assembly according to claim 1, wherein the spatial profile of the second surface of the optical element is curved within a central region of said second surface.

10. The optical assembly according to claim 1, wherein the optical element comprises:
a sleeve having opposite ends defining said first and second surfaces; and
one or more optical components mounted within the sleeve.

11. The optical assembly according to claim 10, wherein each of the optical components is a lens, a mirror, a diffractive optical element or a pinhole.

12. The optical assembly according to claim 1, further comprising at least one additional optical element mounted within the cavity, each of the at least one additional optical element being a lens, a mirror, a diffractive optical element or a pinhole.

13. The optical assembly according to claim 1, wherein said at least one optical subassembly comprises a plurality of optical subassemblies.

14. An optical assembly, comprising:
a barrel defining a cavity having a center axis, the barrel having an inner wall provided with a set of internal threads; and
at least one optical subassembly, the at least one optical subassembly comprising a seat provided in the cavity and an optical element mounted in the cavity, the optical element having a curved abutment surface engaging the seat and a perimeter wall provided with a set of external threads engaging the internal threads of the inner wall of the barrel;
wherein the internal threads and the external threads have a thread profile including a load-bearing thread face perpendicular to the center axis of the cavity.

15. The optical assembly according to claim 14, wherein the curved abutment surface has a convex or a concave spatial profile.

16. The optical assembly according to claim 14, wherein the curved abutment surface has a spatial profile that is spherical, aspherical or cylindrical.

17. The optical assembly according to claim 14, wherein the thread profile of the internal and external threads is a Buttress thread profile.

18. The optical assembly according to claim 1, wherein the thread profile of the internal threads and the external threads further includes a slanted thread face making an acute angle with the load-bearing thread face.

19. The optical assembly according to claim 1, wherein the thread profile of the internal threads and the external threads is a square thread profile.

20. The optical assembly according to claim 14, wherein the optical element comprises:
a sleeve provided with the curved abutment surface engaging the seat and the perimeter wall provided with the external threads; and
one or more optical components mounted in the sleeve.

21. The optical assembly according to claim 20, wherein each of the optical components is a lens, a mirror, a diffractive optical element or a pinhole.

22. The optical assembly according to claim 14, further comprising at least one additional optical element mounted within the cavity, each of the at least one optical element being a lens, a mirror, a diffractive optical element or a pinhole.

23. The optical assembly according to claim 14, wherein said at least one optical subassembly comprises a plurality of optical subassemblies.

* * * * *